United States Patent
Eto et al.

(10) Patent No.: US 11,806,794 B2
(45) Date of Patent: Nov. 7, 2023

(54) PROCESSING DEVICE AND PROCESSING METHOD

(71) Applicant: MITSUBISHI HEAVY INDUSTRIES, LTD., Tokyo (JP)

(72) Inventors: Jun Eto, Tokyo (JP); Hirokazu Unno, Tokyo (JP); Shinichi Takeuchi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 562 days.

(21) Appl. No.: 16/631,056

(22) PCT Filed: Nov. 7, 2017

(86) PCT No.: PCT/JP2017/040165
§ 371 (c)(1),
(2) Date: Jan. 14, 2020

(87) PCT Pub. No.: WO2019/092797
PCT Pub. Date: May 16, 2019

(65) Prior Publication Data
US 2020/0147703 A1    May 14, 2020

(51) Int. Cl.
*B23C 3/13*   (2006.01)
*B23Q 3/08*   (2006.01)
(Continued)

(52) U.S. Cl.
CPC .............. *B23C 3/13* (2013.01); *B23C 3/002* (2013.01); *B23Q 1/0072* (2013.01); *B23Q 3/064* (2013.01);
(Continued)

(58) Field of Classification Search
CPC ........ B23Q 3/103; B23Q 3/088; B23Q 3/061; B23Q 3/065; B23Q 1/0063–009;
(Continued)

(56) References Cited

U.S. PATENT DOCUMENTS 3,681,834 A * 8/1972 Seidenfaden .......... B23Q 3/103
269/45
3,711,082 A * 1/1973 Seidenfaden .......... B23Q 3/088
269/21
(Continued)

FOREIGN PATENT DOCUMENTS

CN   1426342    6/2003
CN   101412120  4/2009
(Continued)

OTHER PUBLICATIONS

Office Action dated Jan. 25, 2021 in corresponding Chinese Application No. 201780093025.2 (with English translation).
(Continued)

*Primary Examiner* — Erica E Cadugan
(74) *Attorney, Agent, or Firm* — Wenderoth, Lind & Ponack, L.L.P.

(57) ABSTRACT

A processing device includes: a first processing position (A1) and a second processing position (A2) at which rough processing is performed on a workpiece (W); a third processing position (B1) at which final finishing processing is performed on the workpiece (W) that was processed at the second processing position (A2); flexible vises (7) provided to the first processing position (A1) and the second processing position (A2), the flexible vises (7) securing the workpiece (W) by clamping the same; and a quick clamping device (20) provided to the third processing position (B1), the quick clamping device (20) securing the workpiece (W) by means of a pin. The processing device also includes a control unit that controls a rough processing tool for performing rough processing and a final finishing processing tool for performing final finishing processing.

8 Claims, 16 Drawing Sheets

(51) Int. Cl.
*B23Q 7/04* (2006.01)
*B23Q 7/14* (2006.01)
*B23Q 41/02* (2006.01)
*G05B 19/401* (2006.01)
*B23Q 3/06* (2006.01)
*B23Q 3/10* (2006.01)
*B23Q 1/00* (2006.01)
*B23C 3/00* (2006.01)

(52) U.S. Cl.
CPC ............ *B23Q 3/065* (2013.01); *B23Q 3/08* (2013.01); *B23Q 3/088* (2013.01); *B23Q 3/103* (2013.01); *B23Q 7/1494* (2013.01); *B23Q 41/02* (2013.01); *B23C 2220/605* (2013.01); *B23C 2270/08* (2013.01); *B23Q 2240/005* (2013.01); *B23Q 2240/007* (2013.01); *Y10T 29/5124* (2015.01); *Y10T 29/5196* (2015.01); *Y10T 409/30532* (2015.01); *Y10T 409/305264* (2015.01); *Y10T 409/309016* (2015.01)

(58) Field of Classification Search
CPC ...... B23Q 7/14–7/1494; B23Q 39/04–39/048; B23Q 41/02; B26D 7/018; B25B 11/005–11/007; B25B 5/003; B25B 5/006; Y10T 409/30868–309128; Y10T 29/5196; Y10T 29/5124; Y10T 29/5194; Y10S 269/90; G05B 19/401; G05B 19/4015; G05B 19/402; G05B 2219/50125; G05B 2219/50132; B23C 2220/605
USPC ............ 269/21, 37–45, 900, 309–314, 291, 269/309–310; 409/219–227; 700/114, 700/186–195; 29/33 P, 563
See application file for complete search history.

(56) References Cited

U.S. PATENT DOCUMENTS

| | | | |
|---|---|---|---|
| 3,766,861 A | 10/1973 | Ash, II | |
| 4,140,305 A * | 2/1979 | Rabin | B23Q 3/103 269/900 |
| 4,828,240 A * | 5/1989 | Longenecker | B23Q 3/103 269/900 |
| 4,841,431 A * | 6/1989 | Takagi | G05B 19/41815 700/82 |
| 5,285,373 A | 2/1994 | Watanabe et al. | |
| 5,788,225 A * | 8/1998 | Iwata | B23Q 3/103 269/309 |
| 5,810,344 A | 9/1998 | Nishimoto | |
| 6,094,793 A * | 8/2000 | Szuba | G05B 19/4083 409/221 |
| 6,328,507 B1 * | 12/2001 | Shoda | B23Q 3/18 269/21 |
| 8,534,658 B2 * | 9/2013 | Schron, Sr. | F16B 5/0004 269/37 |
| 2003/0099522 A1 | 5/2003 | Laempe | |
| 2010/0063617 A1 * | 3/2010 | Mori | G05B 19/402 700/175 |
| 2012/0175832 A1 | 7/2012 | Hacker et al. | |
| 2013/0202378 A1 | 8/2013 | Yamane et al. | |

FOREIGN PATENT DOCUMENTS

| | | |
|---|---|---|
| CN | 102581632 | 7/2012 |
| CN | 203304657 | 11/2013 |
| CN | 103921070 | 7/2014 |
| CN | 104259774 | 1/2015 |
| CN | 204751479 | 11/2015 |
| DE | 102009058633 | 6/2011 |
| EP | 0 803 316 | 10/1997 |
| JP | 48-44878 | 6/1973 |
| JP | 4-193445 | 7/1992 |
| JP | 3452630 | 9/2003 |
| JP | 2004-031799 | 1/2004 |
| JP | 3170695 | 9/2011 |
| JP | 2012-139802 | 7/2012 |
| JP | 2012-213836 | 11/2012 |

OTHER PUBLICATIONS

Wang Bing, et al., "CNC Machining and Programming", pp. 22-26, Huazhong University of Science and Technology Press, Jun. 2017 (see English translation of Office Action dated Jan. 25, 2021 in corresponding Chinese Application No. 201780093025.2).
International Search Report dated Dec. 26, 2017 in corresponding International (PCT) Application No. PCT/JP2017/040165, with English translation.
Written Opinion of the International Searching Authority dated Dec. 26, 2017 in corresponding International (PCT) Application No. PCT/JP2017/040165, with English translation.
Extended European Search Report dated Oct. 16, 2020 in corresponding European Application No. 17931380.4.

* cited by examiner

Roughing Tool 25

Fig. 10

Final Finishing
Tool 26

Fig. 11

PROCESSING DEVICE AND PROCESSING METHOD

TECHNICAL FIELD

The present invention relates to a processing device and a processing method for processing an easily deformable workpiece, for example, such as a large component of an aircraft.

BACKGROUND ART

In order to increase productivity of a large component, it is essential to improve efficiency not only in processing but also in setup. For this purpose, a method of replacing every palette by using a palette changer or a method of processing a plurality of components by placing the plurality of components on one palette is used.

In a case of a rigid component which is less likely to deform, such as an engine block and a housing, setup of the plurality of components can be performed only by carrying out crane work, and the setup is simple. However, in a case of a large and easily deformable component which requires double-sided joint processing, such as an aircraft structural component, a jig needs to be replaced, or adjustment work needs to be carried out during the setup in order to cope with a complicated shape. Consequently, a setup time has to be lengthened. Therefore, in many cases, generally called automation is performed as follows. A flexible manufacturing system (FMS) line using a plurality of the palettes is assembled so that one palette is used for one step. However, a large amount of the palettes is required, thereby resulting in expensive facility depreciation cost.

PTL 1 discloses a machining jig which prevents positioning misalignment as follows. The machining jig enables various types of workpieces to be mounted using an easy setup change without replacing the jig or the component.

CITATION LIST

Patent Literature

[PTL 1] Japanese Patent No. 3452630

SUMMARY OF INVENTION

Technical Problem

However, PTL 1 discloses the machining jig on the premise that processing is performed on a rigid workpiece which is less likely to deform. Consequently, the machining jig is not applicable to a large and easily deformable workpiece, for example, such as an aircraft structural component (for example, a frame).

The present disclosure aims to provide a processing device and a processing method, which can perform efficient and accurate processing when an easily deformable workpiece such as a large component of an aircraft is processed through a plurality of steps.

Solution to Problem

According to an aspect of the present invention, there is provided a processing device including a roughing position for performing roughing on a workpiece, a final finishing position for performing final finishing on the workpiece processed at the roughing position, a clamping fixture disposed at the roughing position, and clamping and fixing the workpiece, and a pin fixture disposed at the final finishing position, and fixing the workpiece by using a pin.

The processing device includes the roughing position for performing the roughing on the workpiece, and the final finishing position for performing the final finishing on the workpiece. The workpiece has predetermined rigidity before the roughing. Accordingly, even if the workpiece is clamped, the workpiece does not greatly deform. Therefore, the clamping fixture which can be easily fixed is disposed at the roughing position.

On the other hand, the roughing is previously performed at the final finishing position. Accordingly, the rigidity of the workpiece is reduced, thereby causing a possibility that the workpiece may deform if the workpiece is clamped. Therefore, the pin fixture which fixes the workpiece by using the pin is disposed at the final finishing position.

The clamping fixture and the pin fixture are properly used depending on the roughing and the final finishing. Accordingly, the roughing and the final finishing can be efficiently and accurately performed.

The roughing position may include not only the roughing but also the finishing on a surface other than a surface for performing the final finishing.

As the clamping fixture, in addition to an external clamp which clamps the workpiece by pinching the workpiece from both outer sides, an internal clamp which clamps the workpiece by applying a load outward from the inside of a pocket portion of the workpiece can be adopted.

For example, the processed workpiece has a long and thin shape having a length of several meters (4 to 5 m) and a plate thickness of several millimeters (1 to 2 mm).

Furthermore, the processing device according to the aspect of the present invention may include a roughing tool for processing the workpiece at the roughing position, a final finishing tool for processing the workpiece at the final finishing position, and a control unit that controls the roughing tool and the final finishing tool.

The roughing and the final finishing are performed by the control unit. Accordingly, automatic processing can be promoted.

Furthermore, in the processing device according to the aspect of the present invention, the control unit may set a jig origin disposed in a jig for fixing the workpiece as a position reference when the processing is performed at the roughing position, and may set a workpiece origin disposed in the workpiece as a position reference when the processing is performed at the final finishing position.

The processing is performed at the roughing position before a final shape of the workpiece is determined. During the processing, there is a possibility that the workpiece may deform due to distortion of a raw material of the workpiece. Accordingly, the jig for fixing the workpiece is set as the position reference. On the other hand, during the processing at the final finishing position, the final shape of the workpiece is determined. Accordingly, the workpiece is set as the position reference, thereby ensuring processing accuracy.

Furthermore, in the processing device according to the aspect of the present invention, the workpiece origin may be disposed when the processing is completely performed at the roughing position.

The workpiece origin is set when the processing is completely performed at the roughing position. In this manner, the workpiece origin can be formed in the workpiece immediately before the final finishing. Accordingly, a mismatch between pre-processing and the final finishing can be minimized as much as possible.

Furthermore, the processing device according to the aspect of the present invention may include a sub-base installed on a table, and a jig base detachably fixed onto the sub-base.

The jig base is detachably fixed onto the table via the sub-base. In this manner, a plurality of the jig bases corresponding to various workpieces having different shapes are prepared, thereby enabling processing corresponding to various workpieces to be performed. In order to detachably fix the jig base to the sub-base, it is preferable to use a pin clamp unit including a pin fixed to one of the jig base the sub-base, and a pin fixing member fixed to the other of the jig base and the sub-base so as to accommodate and fix the pin. The pin clamp unit can be operated using pneumatic pressure, for example.

Furthermore, the processing device according to the aspect of the present invention may include a support block disposed at the final finishing position, and supporting the workpiece by coming into surface contact with a facing surface of the workpiece.

The roughing is previously performed on the workpiece on which the final finishing is to be performed. Accordingly, the workpiece has lower rigidity. Therefore, the support block which comes into contact with and supports the facing surface of the workpiece is provided. In this manner, during the processing, the workpiece can be processed without causing chatter vibration.

For example, a detail having a front surface shape corresponding to a shape of the facing surface is used as the support block.

Furthermore, in the processing device according to the aspect of the present invention, the support block may be detachably fixed to the jig base.

The support block is detachably fixed to the jig base. Accordingly, a plurality of the support blocks corresponding to the facing surfaces of various workpiece having different shapes are prepared, thereby enabling processing corresponding to various workpieces to be performed.

In order to detachably fix the support block to the jig base, it is preferable to use a pin clamp unit including a pin fixed to one of the support block and the jig base, and a pin fixing member fixed to the other of the support block and the jig base so as to accommodate and fix the pin. The pin clamp unit can be operated using pneumatic pressure, for example.

Furthermore, in the processing device according to the aspect of the present invention, the support block may have a suction piping which is open to a side of the facing surface of the workpiece. Suction means for suctioning gas via the suction piping may be provided.

Gas is suctioned by the suction means (for example, a vacuum pump) via the suction piping of the support block. In this manner, the facing surface of the workpiece was adsorbed. In this manner, the workpiece can be reliably held during the final finishing. The suction piping formed in the support block may be connected to the suction piping formed in the jig base and the sub-base, and the gas may be suctioned from common suction means.

Furthermore, in the processing device according to the aspect of the present invention, the roughing position may have a first processing position for performing the roughing on a front surface of the workpiece, and a second processing position for performing the roughing and finishing on a rear surface of the workpiece. The final finishing position may have a third processing position for performing the finishing on the front surface of the workpiece. Transport means for transporting the workpiece between the first processing position, the second processing position, and the third processing position may be provided.

In a case where the front surface and the rear surface of the workpiece are processed, the workpiece is transported between the first processing position, the second processing position, and the third processing position by a transport machine. The roughing is performed on the front surface at the first processing position. The roughing and the finishing are performed on the rear surface at the second processing position. The finishing is performed on the front surface at the third processing position. In this manner, the workpiece can be efficiently processed using one palette.

In addition, according to another aspect of the present invention, there is provided a processing method including a roughing step of performing roughing on a workpiece, and a final finishing step of performing final finishing on the workpiece processed in the roughing step. In the roughing step, a jig origin disposed in a jig for fixing the workpiece is set as a position reference. In the final finishing step, a workpiece origin disposed in the workpiece is set as a position reference.

The roughing step is performed before the final shape of the workpiece is determined. During the processing, there is a possibility that the workpiece may deform due to distortion of a raw material of the workpiece. Accordingly, the jig for fixing the workpiece is set as the position reference. On the other hand, in the final finishing step, the final shape of the workpiece is determined. Accordingly, the workpiece is set as the position reference, thereby ensuring processing accuracy.

Advantageous Effects of Invention

A workpiece can be efficiently and accurately processed in a plurality of steps.

BRIEF DESCRIPTION OF DRAWINGS

FIG. 10 schematically depicts a roughing tool.

FIG. 11 schematically depicts a finishing tool.

DESCRIPTION OF EMBODIMENTS

Hereinafter, an embodiment of a processing device and a processing method will be described.

In the present embodiment, an easily deformable workpiece such as a large component of an aircraft is machined. The workpiece is made of metal such as an aluminum alloy, and is processed into a shape of an aircraft structure frame. For example, the workpiece has an elongated shape whose length is several meters (4 to 5 m), is subjected to pocket processing in various ways so that a thickness of the processed plate is several millimeters (1 to 2 mm).

FIGS. 1A to 1I illustrate processing steps using the processing device.

Figure 1A:
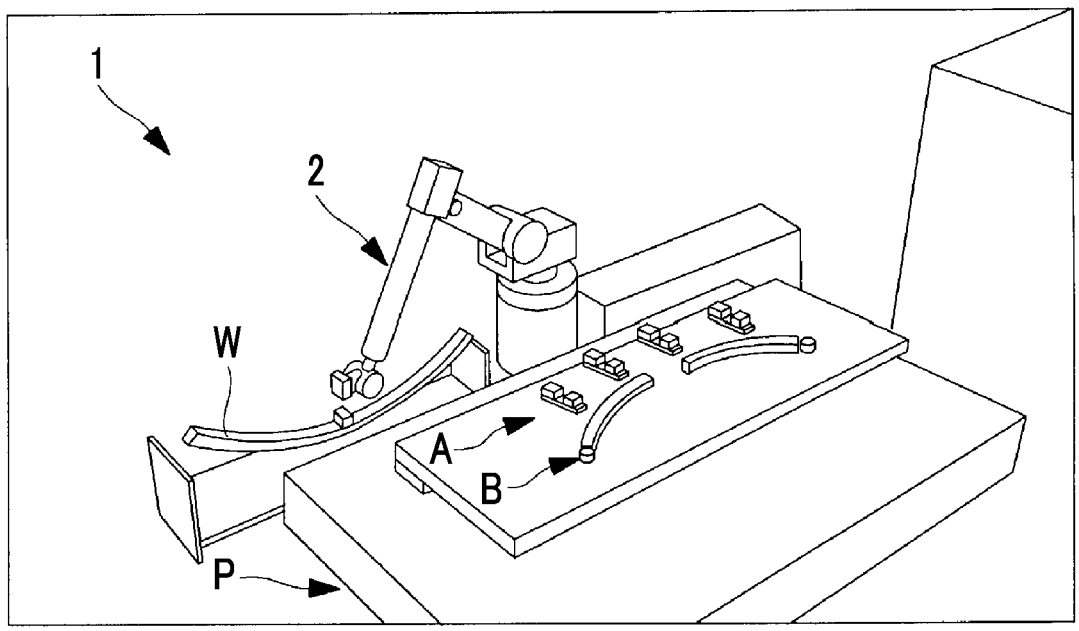
FIG. 1A is a perspective view illustrating a state before a workpiece is placed on a palette.

As illustrated in FIG. 1A, a processing device 1 includes a transport robot 2 for transporting a workpiece W, and a palette P on which the workpiece W is placed during processing. A roughing position A for performing roughing and a final finishing position B for performing final finishing are disposed on the palette P.

Figure 1B:
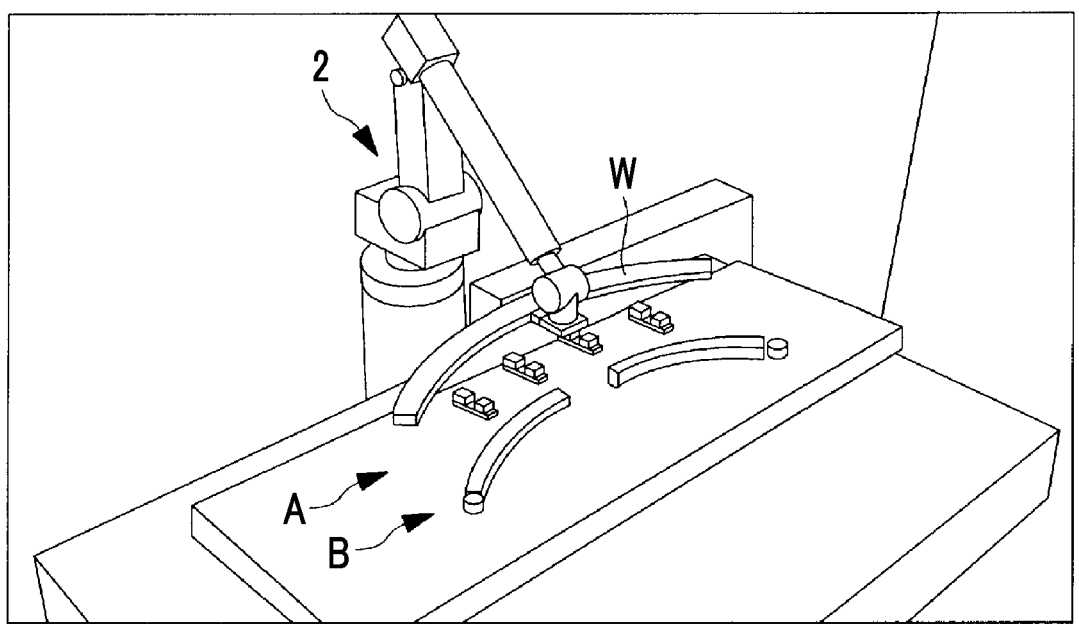
FIG. 1B is a perspective view illustrating a state where the workpiece is placed at a roughing position.
Figure 1C:
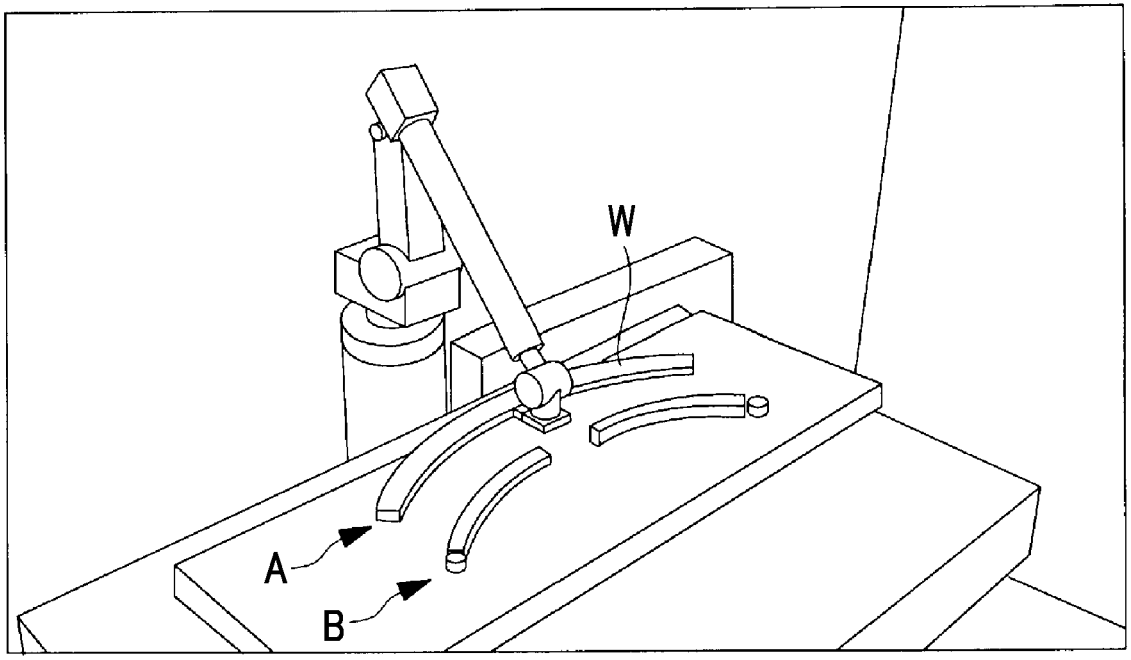
FIG. 1C is a perspective view illustrating a state where the workpiece is placed at the roughing position.
Figure 1D:
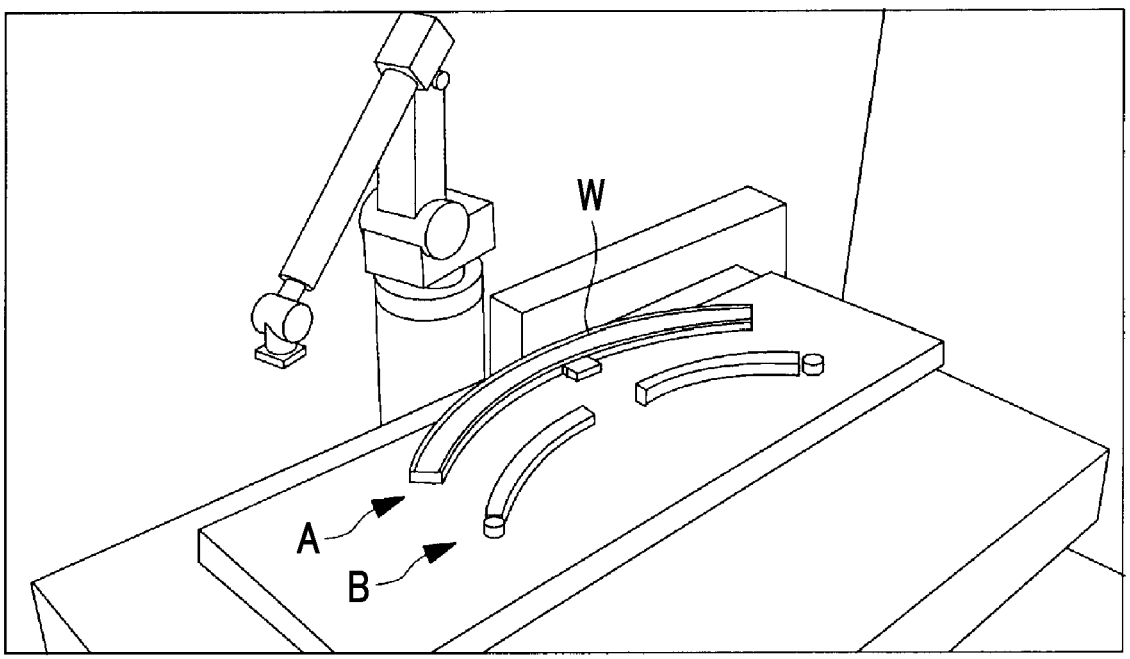
FIG. 1D is a perspective view illustrating a state after roughing is performed on the workpiece at the roughing position.

As illustrated in FIG. 1A, the transport robot (transport machine) 2 grips the workpiece W, and installs the workpiece W at the roughing position A serving as an initial processing position as illustrated in FIGS. 1B and 1C. Then, as illustrated in FIG. 1D, the roughing is performed on a front surface of the workpiece W by using an end mill (roughing tool 25). After the roughing is performed on the front surface of the workpiece W, the finishing is performed on the front surface of the workpiece W at the same roughing position.

Figure 1E:
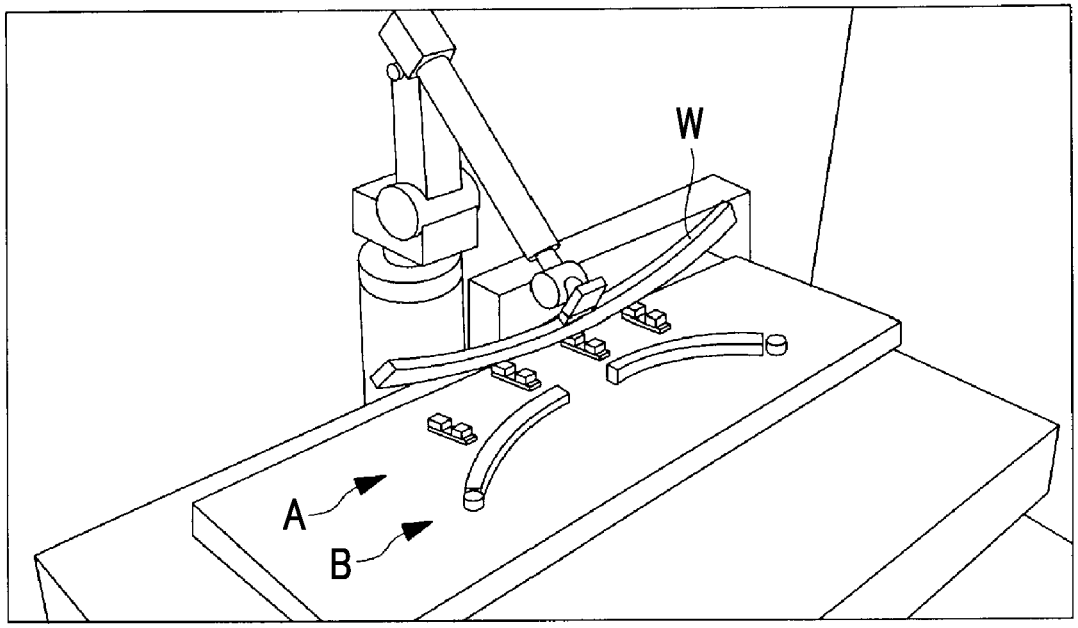
FIG. 1E is a perspective view illustrating a state where the workpiece is removed from the roughing position.
Figure 1F:
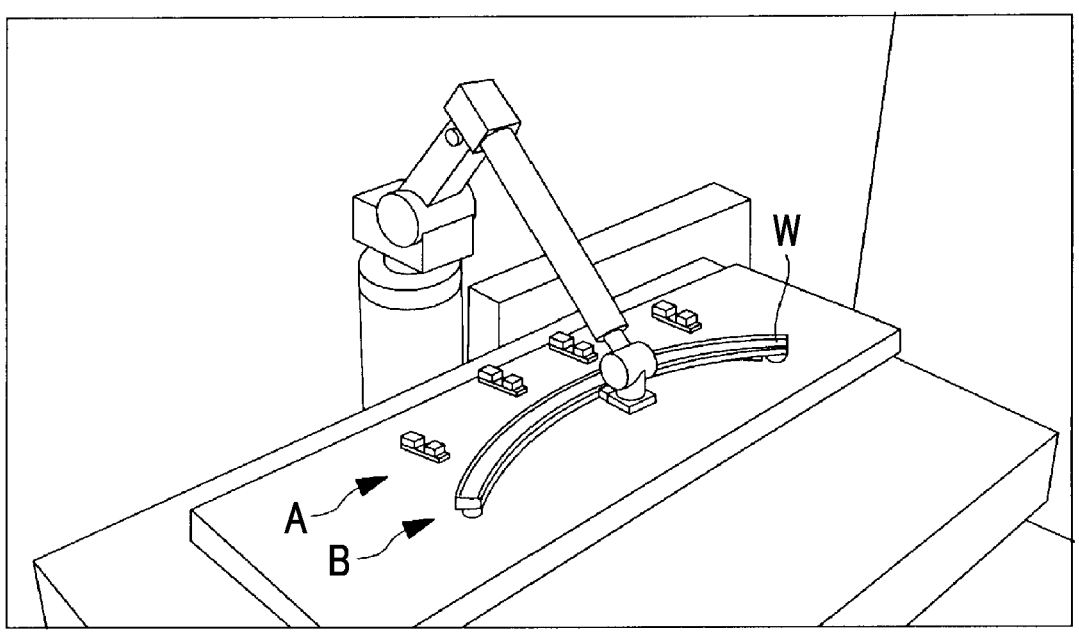
FIG. 1F is a perspective view illustrating a state where the workpiece is placed at a final finishing position.

Then, as illustrated in FIG. 1E, after front and rear surfaces of the workpiece W are reversed by the transport robot 2, the workpiece is installed at the final finishing position B as illustrated in FIG. 1F. The final finishing is performed on the rear surface of the workpiece W at the final finishing position B by using an end mill (final finishing tool 26).

Figure 1G:
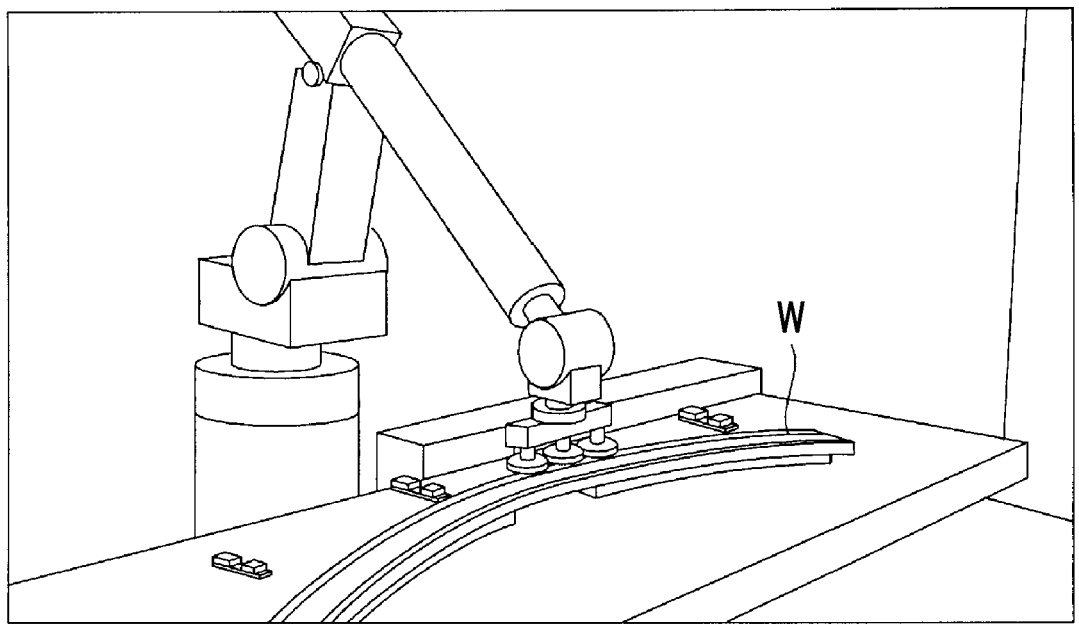
FIG. 1G is a perspective view illustrating a state where the workpiece is removed from the final finishing position.
Figure 1H:
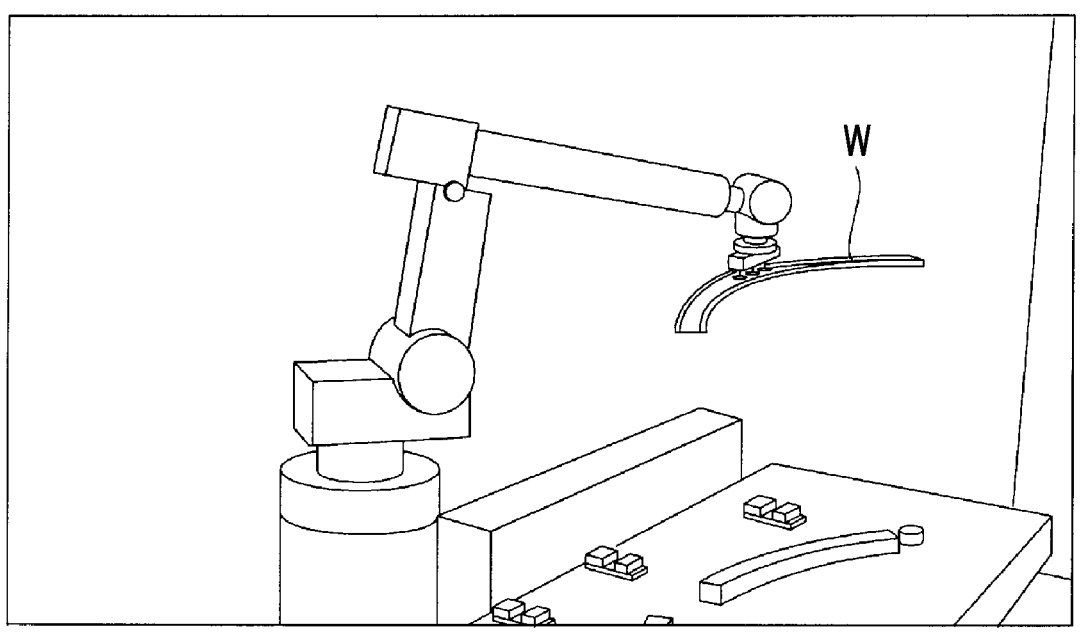
FIG. 1H is a perspective view illustrating a state after the workpiece is removed from the final finishing position.
Figure 1I:
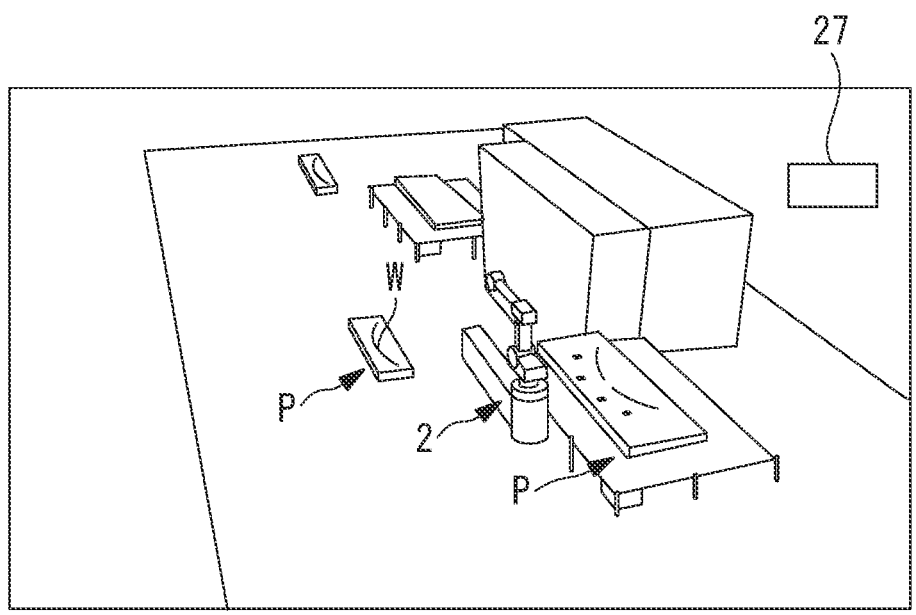
FIG. 1I is a perspective view illustrating a state where the workpiece is transported to a subsequent step.

Then, as illustrated in FIG. 1G, the workpiece W on which the final finishing is performed is gripped by the transport robot 2, and the workpiece W is removed from the final finishing position B as illustrated in FIG. 1H. Then, as illustrated in FIG. 1I, the workpiece W is transported to a subsequent step.

Next, the palette P for processing the workpiece W will be described. In the palette P described below, a case will be described where the processing positions A and B are not two but three as in the palette P illustrated in FIG. 1A.

Figure 2A:
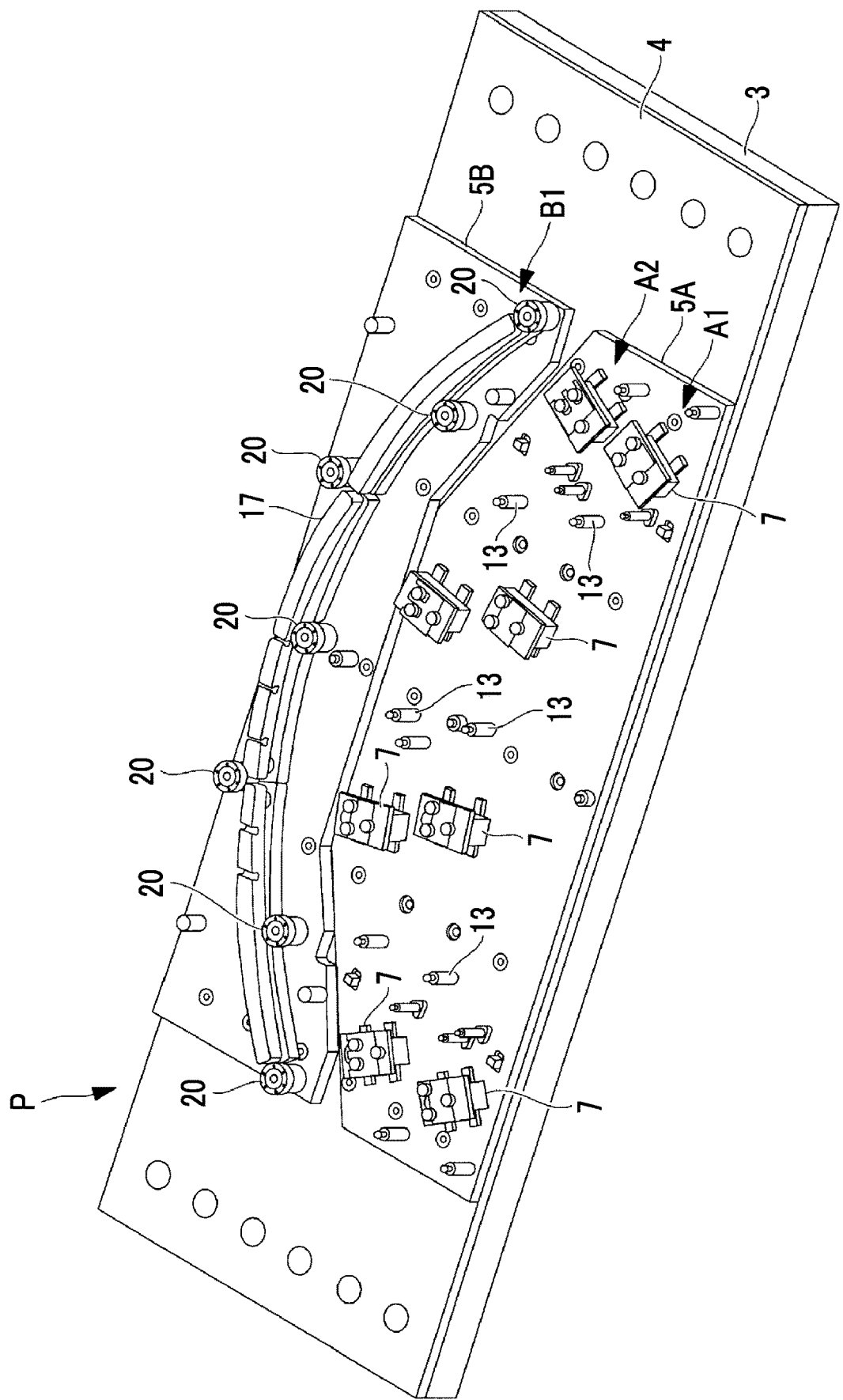
FIG. 2A is a perspective view illustrating the palette.

As illustrated in FIG. 2A, the palette P includes a table 3, a sub-base 4 fixed onto the table 3, and a first jig base 5A and a second jig base 5B which are fixed onto the sub-base 4.

Figure 2B:
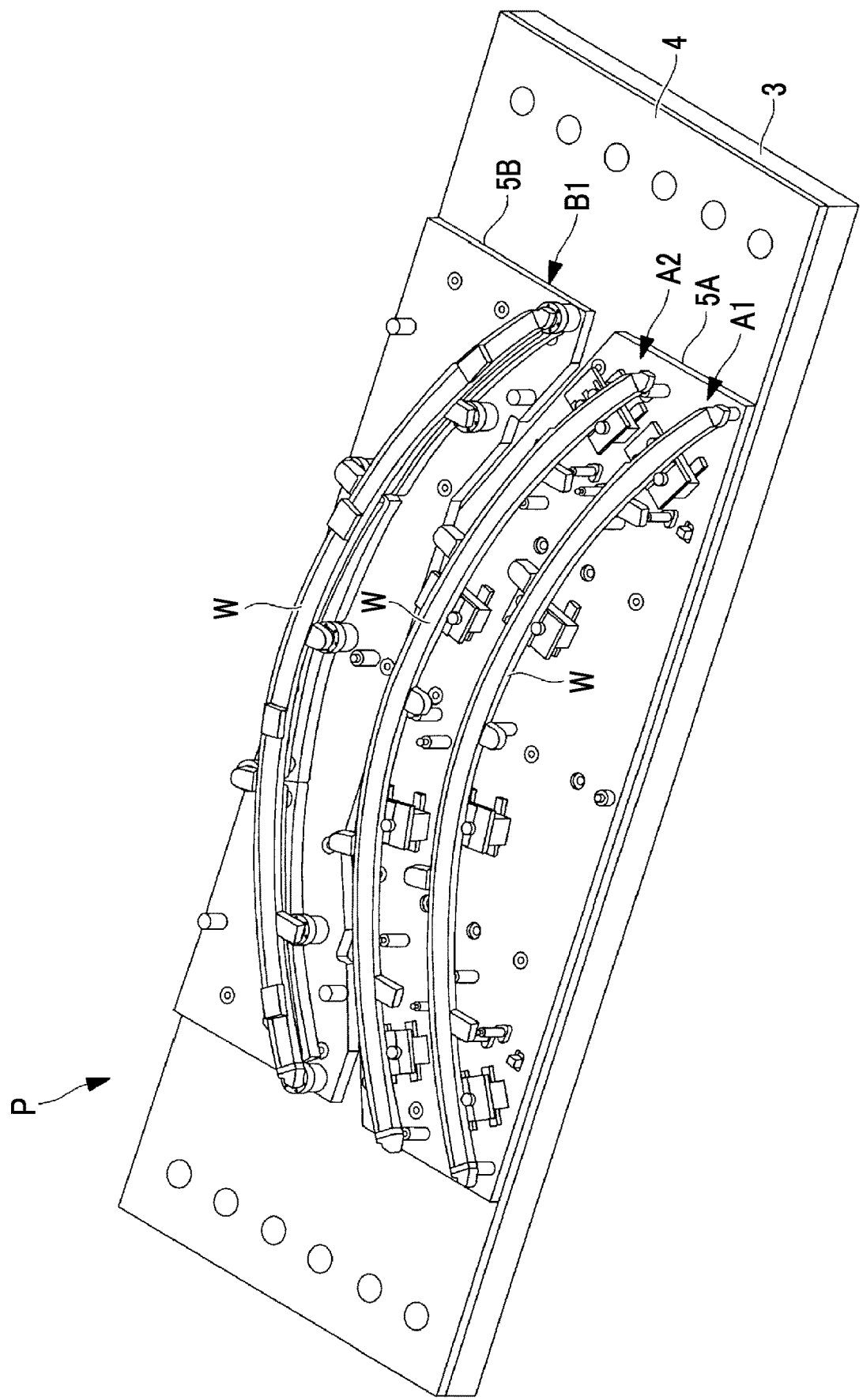
FIG. 2B is a perspective view illustrating a state where the workpiece is installed in the palette in FIG. 2A.

The first jig base 5A is provided with a first processing position A1 for performing the roughing on the front surface of the workpiece W, and a second processing position A2 for performing the roughing and the finishing on the rear surface of the workpiece W. As illustrated in FIG. 2B, the workpiece W is installed at each of the first processing position A1 and the second processing position A2.

The respective processing positions A1 and A2 have a plurality of flexible vises (clamping fixtures) 7 for clamping the workpiece W from the outside in a width direction of the workpiece W. An interval between the flexible vises 7 is 800 mm or longer, for example.

Figure 3:
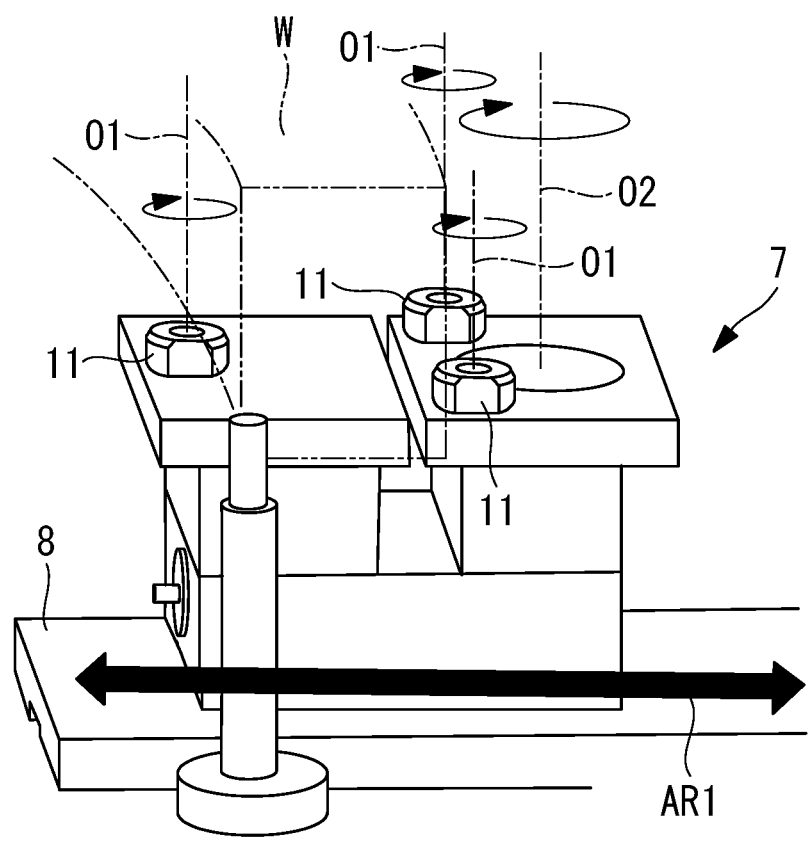
FIG. 3 is a perspective view illustrating a flexible vise.

FIG. 3 illustrates the flexible vise 7. The flexible vise 7 can slide on a rail 8 in a direction of an arrow AR1 which is the width direction of the workpiece W. The flexible vise 7 is fixed in a sliding direction by a slide base. Three jaws 11 respectively rotatable around a vertical axis O1 are disposed on an upper surface of the flexible vise 7. The jaw 11 has a cylindrical shape, and an outer cylindrical surface thereof comes into contact with the workpiece W so as to clamp the workpiece W. In addition, the whole flexible vise 7 is rotatable around a vertical axis O2, and the workpiece W can be clamped in accordance with a shape of the workpiece W. The roughing is completely performed on the front surface of the workpiece W at the first processing position A1.

Accordingly, at the second processing position A2, it is possible to adopt an internal clamp for clamping the workpiece W by applying a load outward from the inside of a pocket portion of the workpiece W.

As illustrated in FIG. 2A, a plurality of jacks 13 protruding upward from the first jig base 5A are disposed between the flexible vises 7. The jack 13 has a cylindrical shape whose height is adjustable. The workpiece W is point-supported from below at a top portion of the jack 13.

The second jig base 5B has a third processing position B1 for performing the final finishing on the front surface of the workpiece W. As illustrated in FIG. 2B, the workpiece W is installed at the third processing position B1.

A detail (support block) 17 is fixed to the third processing position B1. The detail 17 has an elongated shape similar to the workpiece W, and the front surface has a shape corresponding to a finished shape of the rear surface (facing surface) of the workpiece W. In this manner, the rear surface of the workpiece W comes into contact with the front surface of the detail 17 with substantially no gap. The detail 17 has a suction piping (to be described later) which is open on the front surface. The workpiece W is suctioned in a vacuum state, and is held at a fixed position by the suction piping.

Quick clamping devices (pin fixtures) 20 are disposed on the second jig base 5B at a predetermined interval on both sides of the detail 17. The quick clamping device 20 is a unit that clamps a pin, and includes a pin fixing member that accommodates a tip of the pin fixed to the workpiece W and causes the jaws to grip and fix an outer periphery of the tip of the pin. The quick clamping devices 20 are operated using pneumatic pressure. The quick clamping devices 20 are installed at an interval of 500 mm or longer, for example.

Figure 4A:
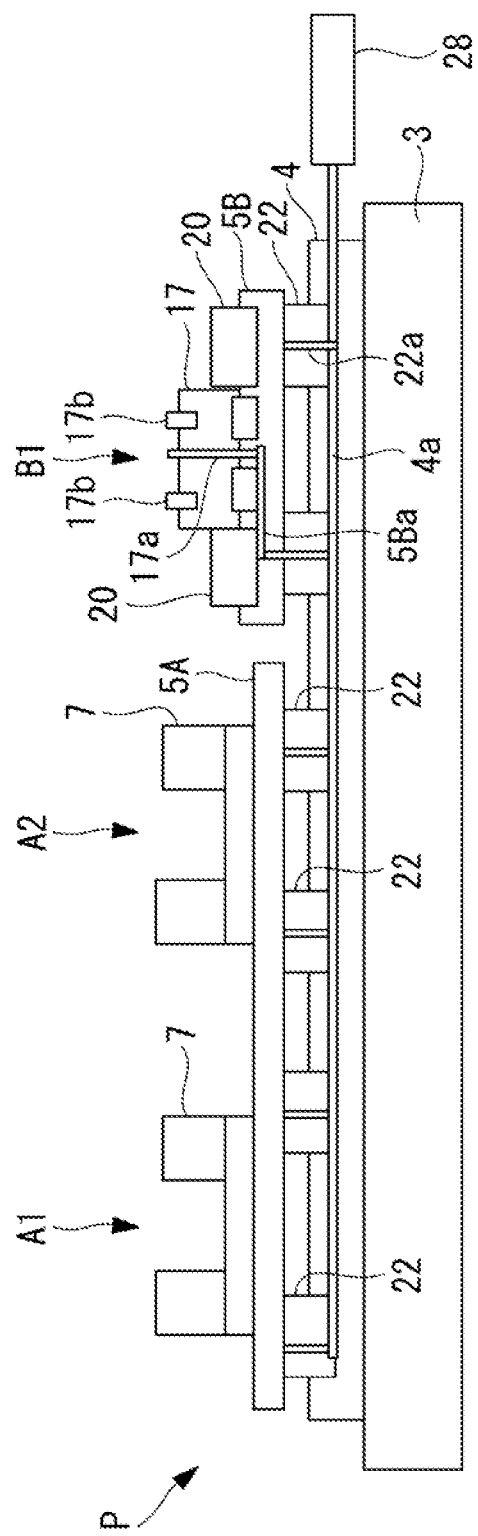
FIG. 4A is a cross-sectional view of the palette.
Figure 4B:
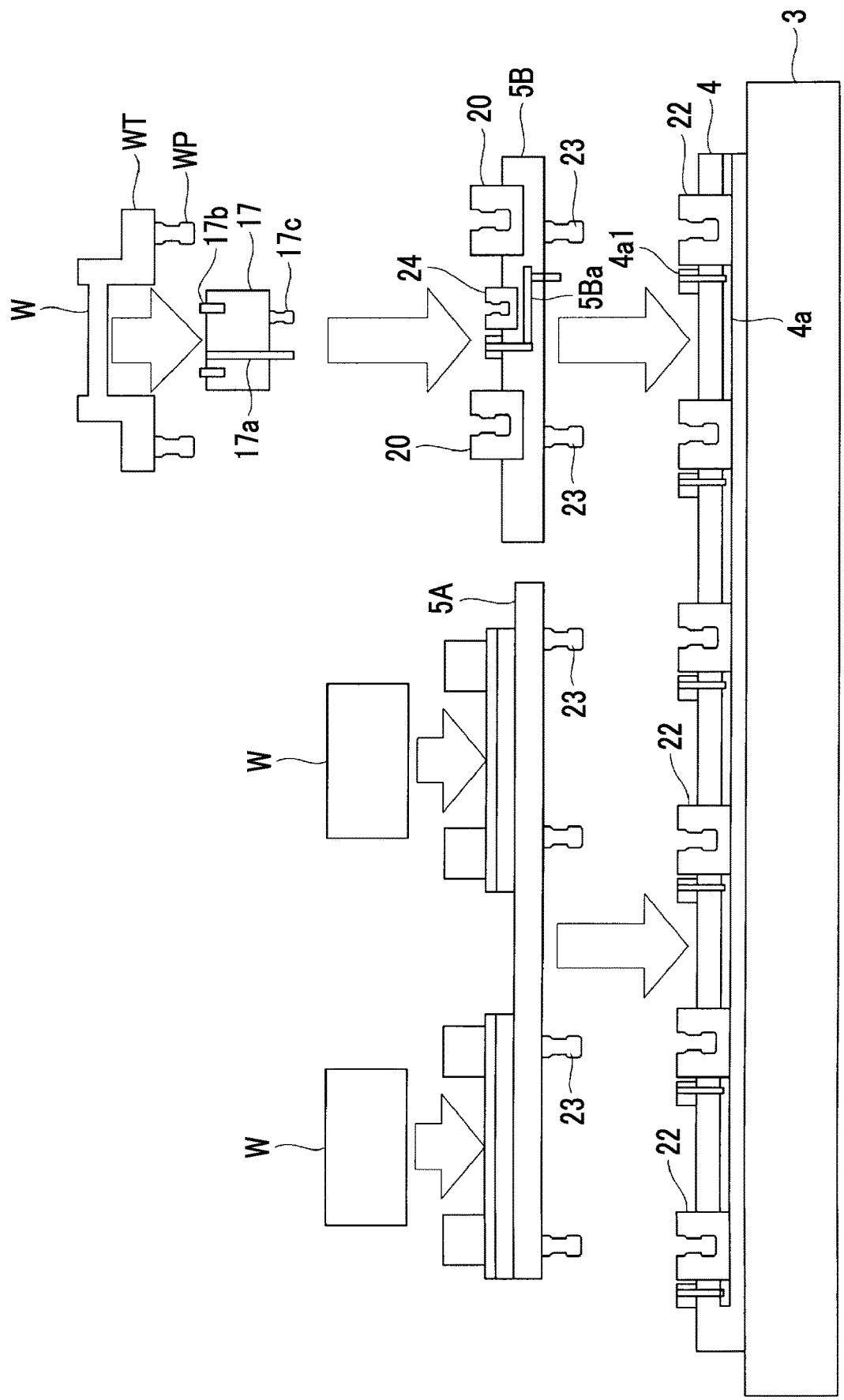
FIG. 4B is an exploded cross-sectional view illustrating the palette in FIG. 4A.

FIGS. 4A and 4B illustrate a cross-sectional view of the palette P. As illustrated in the drawing, the sub-base 4 is installed on the table 3. A suction piping 4a is formed in the sub-base 4. A plurality of quick clamping devices 22 are disposed on the sub-base 4. The quick clamping device 22 has the same structure as that of the quick clamping device 20 disposed on the second jig base 5B, and grips and fixes a pin 23 fixed to the rear surface of the respective jig bases 5A and 5B (refer to FIG. 4B). In addition, as illustrated in FIG. 4A, the quick clamping device 22 has a suction piping 22a, and communicates with a suction piping 5 Ba formed in the second jig base 5B. The suction piping 5Ba formed in the second jig base 5B communicates with a suction piping 17a formed in the detail 17. In this manner, gas is suctioned from a vacuum pump 28 (suction means) via the suction pipings 4a, 22a, 5Ba, and 17a, and the workpiece W is adsorbed on the upper surface of the detail 17. A sealing material 17b is disposed on the front surface side of the detail 17 so as to surround the suction piping 17a which is open on the front surface side, and a region surrounded by the sealing material 17b is effectively suctioned.

Figure 5:
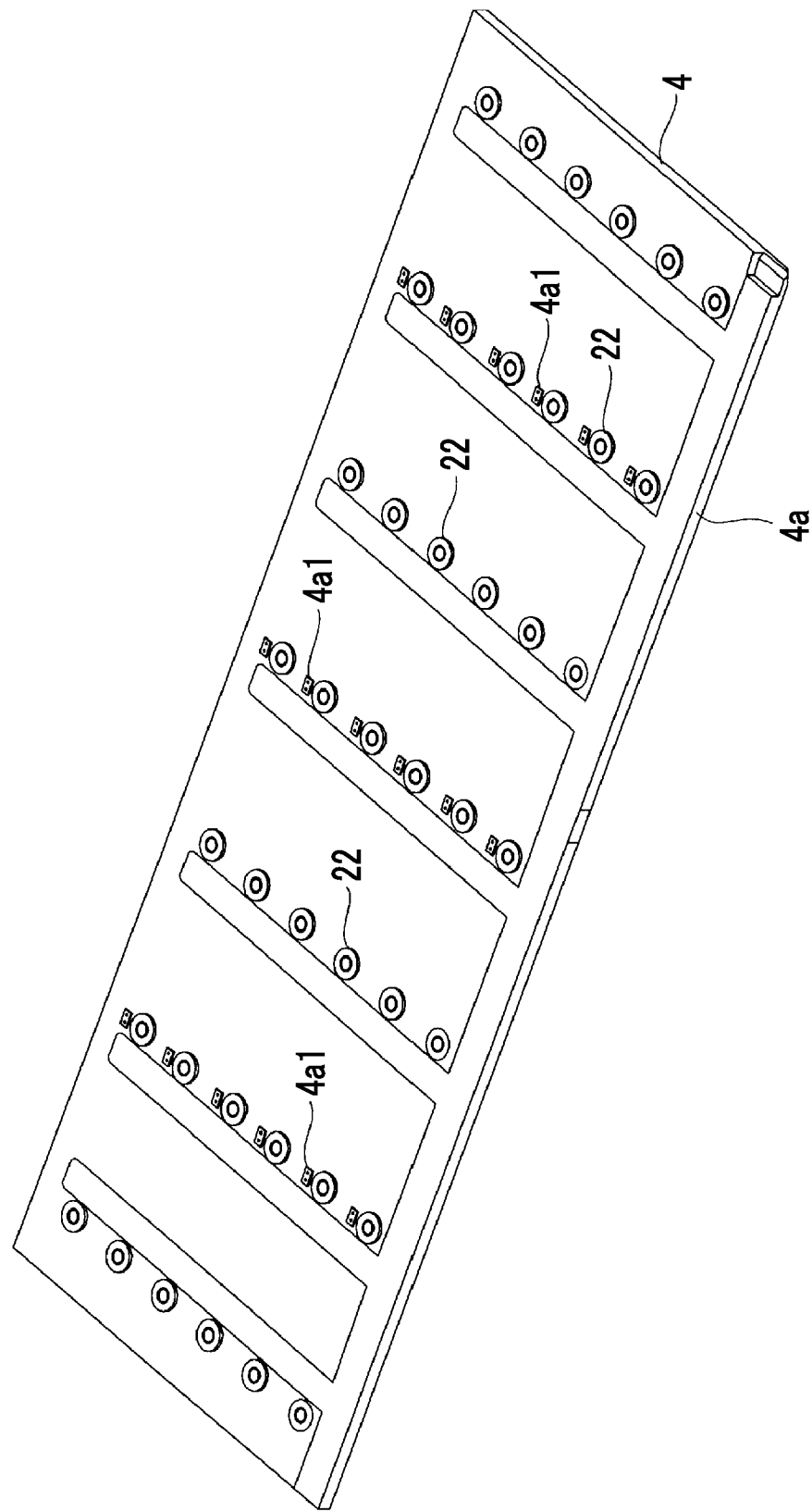
FIG. 5 is a perspective view illustrating a sub-base.

As illustrated in FIG. 5, the suction piping 4a is bifurcated and formed in the sub-base 4. A plurality of piping connectors 4a1 are disposed along the bifurcated suction piping 4a. The suction piping 4a is connected to the suction piping of the jig bases 5A and 5B via the respective piping connectors 4a1. The quick clamping device 22 is disposed next to each of the piping connectors 4a1.

Air pressure for operating the respective quick clamping devices 20, 22, and 24 is supplied from a compressor (not illustrated) by using an air pressure flow path (not illustrated) disposed separately from the suction pipings 4a, 22a, 5Ba, and 17a.

As illustrated in FIG. 4B, the detail 17 can be attached and detached by the quick clamping device 24 disposed in the second jig base 5B. The quick clamping device 24 has the same structure as that of the quick clamping device 20 disposed on the second jig base 5B, and grips and fixes a pin 17c fixed to the rear surface of the detail 17.

The quick clamping device 20 disposed in the second jig base 5B detachably fixes a pin WP fixed to a tab WT disposed in the workpiece W. The pin WP is attached after the finishing is completely performed on the rear surface of the workpiece W at the second processing position A2. Specifically, tapping is performed on the tab WT, and the pin WP provided with a screw is screwed and fixed to the tab WT. A round hole may be formed in the tab WT so that the pin WP is fitted to the tab WT. The tab WT is removed after the final finishing is completely performed on the workpiece W.

The processing device 1 includes a control unit 27 that controls various operations. For example, the control unit 27, as schematically shown in FIG. 1I, is configured to include a central processing unit (CPU), a random access memory (RAM), a read only memory (ROM), and a computer-readable storage medium. Then, as an example, a series of processes for realizing various functions is stored in the storage medium in a form of a program. The CPU causes the RAM to read the program, and executes information processing/arithmetic processing, thereby realizing various functions. The program may adopt a form in which the program is installed in advance in the ROM or other storage media, a form in which the program is provided in a stored state in the computer-readable storage medium, or a form in which the program is distributed via wired or wireless communication means. The computer-readable storage medium includes a magnetic disk, a magneto-optical disk, a CD-ROM, a DVD-ROM, and a semiconductor memory.

Figure 6:
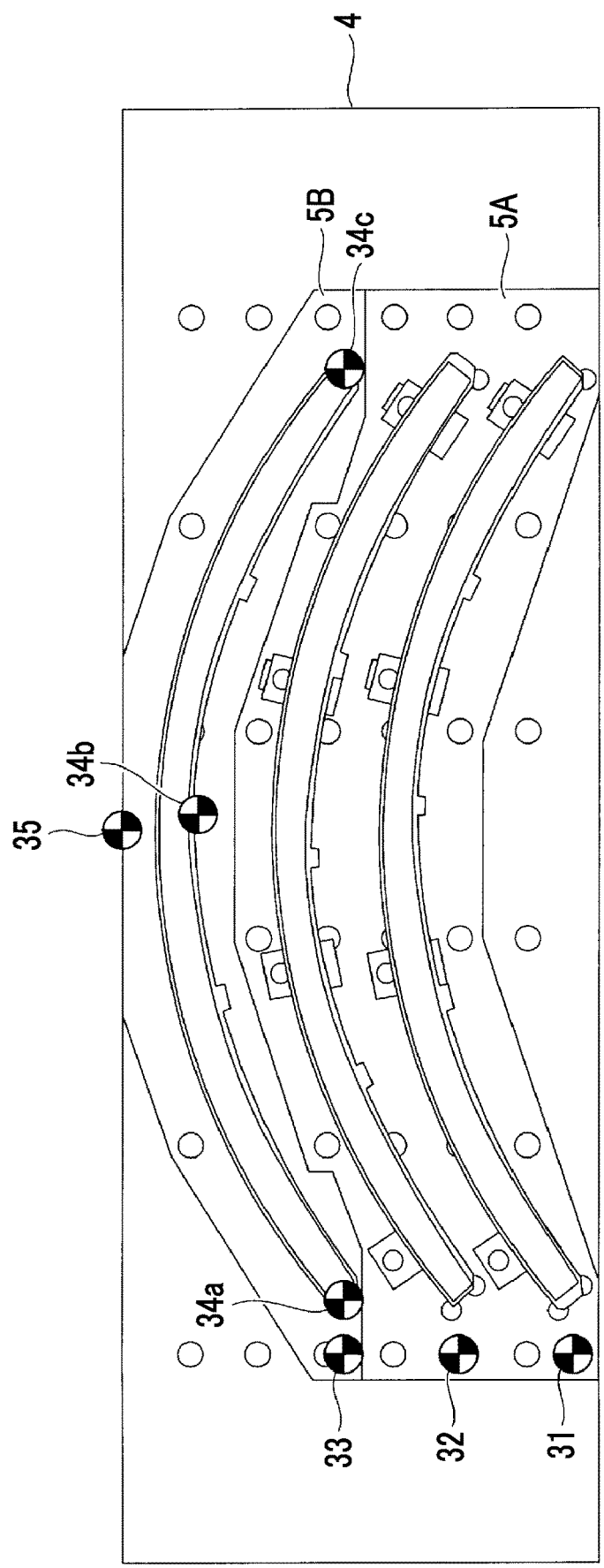
FIG. 6 is a plan view illustrating a reference position.

FIG. 6 illustrates various reference positions used by the control unit 27. A first jig origin 31 is disposed on a side of the first processing position A1 of the first jig base 5A, and a second jig origin 32 is disposed on a side of the second processing position A2. For example, the jig origins 31 and 32 are protruding objects protruding from the upper surface of the first jig base 5A, and positions of the jig origins 31 and 32 can be measured by a touch sensor (not illustrated). The respective jig origins 31 and 32 are used as the reference positions when the processing is performed at the first processing position A1 and the second processing position A2.

A third jig origin 33 is disposed on a side of the second jig base 5B. For example, the third jig origin 33 is a protruding object protruding from the upper surface of the second jig base 5B, and a position of the third jig origin 33 can be measured by a touch sensor (not illustrated). The third jig origin 33 measures the position of the second jig base 5B in a z-direction (upward-downward direction), and is used to correct inclination of the second jig base 5B.

The workpiece W installed in the second jig base 5B is provided with three workpiece origins 34a, 34b, and 34c arranged away from each other in a longitudinal direction. The workpiece origins 34a, 34b, and 34c are provided after the finishing is completely performed on the rear surface of the workpiece W at the second processing position A2, and are provided by drilling holes in the workpiece W, for example. The workpiece origins 34a, 34b, and 34c are used when the final finishing is performed. Without being limited to three, the number of workpiece origins may be two, four, or more.

The sub-base 4 has a palette origin 35. For example, the palette origin 35 is a protruding object protruding from the upper surface of the sub-base 4, and a position of the palette origin 35 can be measured by a touch sensor (not illustrated). The palette origin 35 is used as the reference position for measuring each position.

Next, a processing method using the above-described processing device 1 will be described.

[Roughing]

Figure 7:
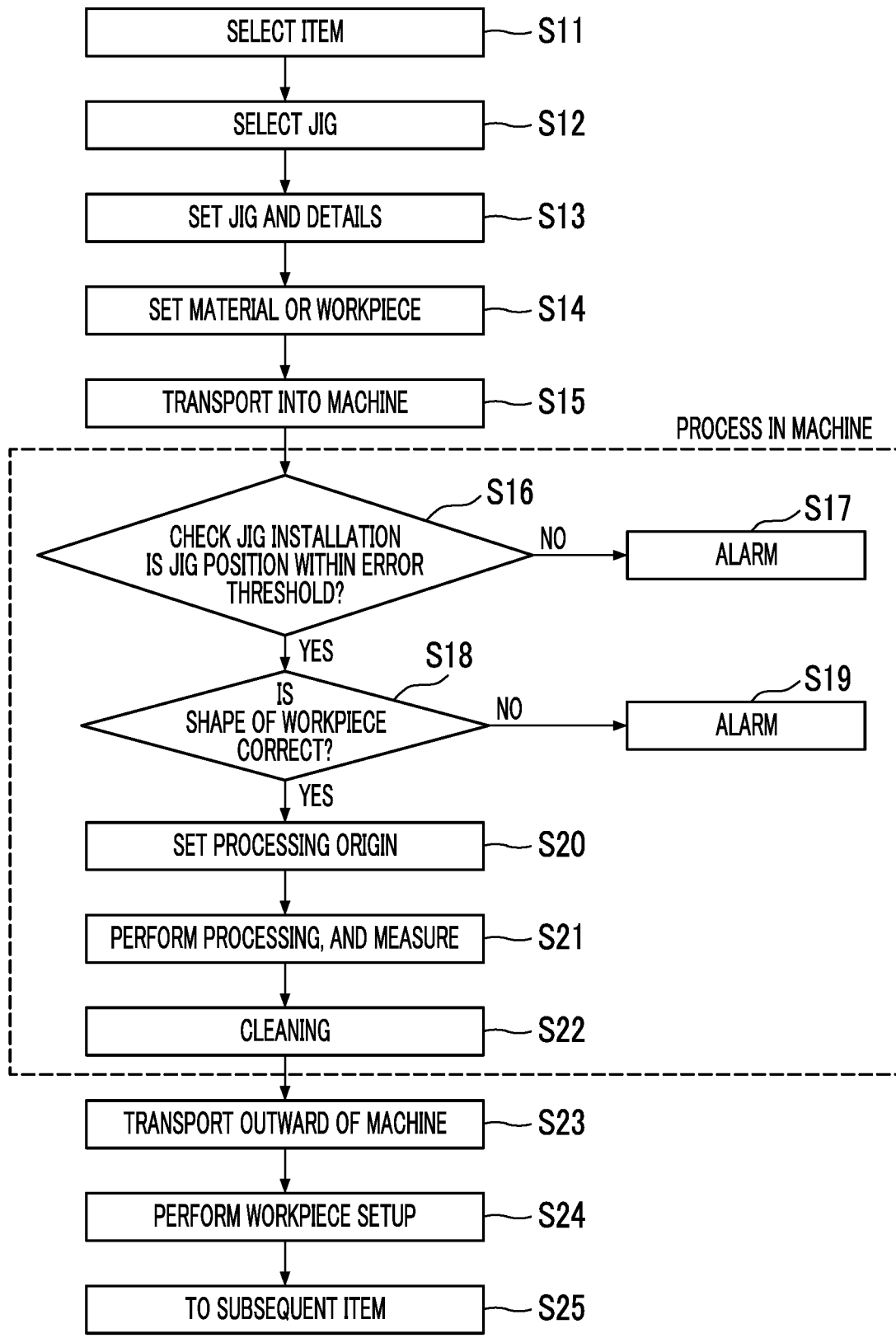
FIG. 7 is a flowchart illustrating a roughing step.

FIG. 7 illustrates a step for the roughing of the workpiece W at the first processing position A1 (refer to FIG. 2A) and the second processing position A2 (refer to FIG. 2A). The following steps are performed in accordance with commands of the control unit 27.

First, in Step S11, a processing target item is selected from among several types of the workpiece W. Then, the first jig base 5A (refer to FIG. 2A) corresponding to the selected item is selected (Step S12).

The first jig base 5A corresponding to the selected jig base is set at the first processing position A1 or the second processing position A2 (Step S13). The first jig base 5A is set in a single operation by inserting the pin 23 into the quick clamping device 22 (refer to FIG. 4B) of the sub-base 4. In this case, the workpiece W is fixed at a predetermined position by a plurality of the flexible vises 7 (refer to FIG. 2A). The lower surface of the workpiece W is point-supported by a plurality of the jacks 13 so that distortion of the workpiece W can be effectively removed. If necessary, the detail 17 is set. However, the detail 17 is not used at the first processing position A1 and the second processing position A2. Accordingly, the detail 17 is not set in principle.

Then, a raw material or the workpiece W is set at the first processing position A1 or the second processing position A2 (Step S14). Here, the raw material means the workpiece W obtained before the roughing is performed.

Next, the palette P is moved into the apparatus (Step S15). Here, the apparatus means the processing device for performing machining by using an end mill.

In the machine, whether the jig is installed is confirmed, and whether the installation falls within a position error threshold (Step S16). Here, whether the jig is installed is confirmed. In this manner, it is confirmed whether the jig is installed at a predetermined position, and it is confirmed whether an installation position of the jig falls within a predetermined range. If determination in Step S16 is NO, an alarm is issued (Step S17). If the determination in Step S16 is YES, the process proceeds to Step S18.

In Step S18, a type of the workpiece W is identified, and it is determined whether a shape of the workpiece is correct. For example, this determination is made in such a way that a touch sensor (probe) held in a main shaft of the processing device comes into contact with the tab WT (refer to FIG. 4B)

of the workpiece W. The tab WT is a protruding portion protruding from a product portion of the workpiece W, and is a non-product portion of the workpiece W. If the determination in Step S18 is NO, an alarm is issued (Step S19). If the determination in Step S18 is YES, the process proceeds to Step S20.

In Step S20, a processing origin is set. The first jig origin 31 (refer to FIG. 6) and the second jig origin 32 (refer to FIG. 6) are used at the first processing position A1 and the second processing position A2. For example, the jig origins 31 and 32 are detected in such a way that a touch sensor disposed in the main shaft of the processing device comes into contact with the jig origins 31 and 32.

Then, pocket processing is performed in various ways by using an end mill (Step S21). During the processing, a processing amount is appropriately measured.

The finishing is also performed on the rear surface of the workpiece W at the second processing position A2 after the roughing is completely performed on the rear surface of the workpiece W.

The roughing and the finishing are performed on the workpiece W at the second processing position A2. Thereafter, a hole is drilled in the tab WT of the workpiece W, and the pin WP (refer to FIG. 4B) is fixed by being inserted into the hole. The pin WP is used to fix the workpiece to the quick clamping device 20 (refer to FIG. 2A) at the third processing position B1. In addition, a hole for position correction is drilled in the tab WT of the workpiece W. The hole is used as the workpiece origins 34a, 34b, and 34c at the third processing position B1.

If the processing is completely performed, cleaning is performed using an air blow (Step S22), and the workpiece W is transported outward of the apparatus (Step S23).

Then, setup such as removal of the workpiece W is performed (Step S24), and a subsequent item is prepared (Step S25).

[Final Finishing]

Figure 8:
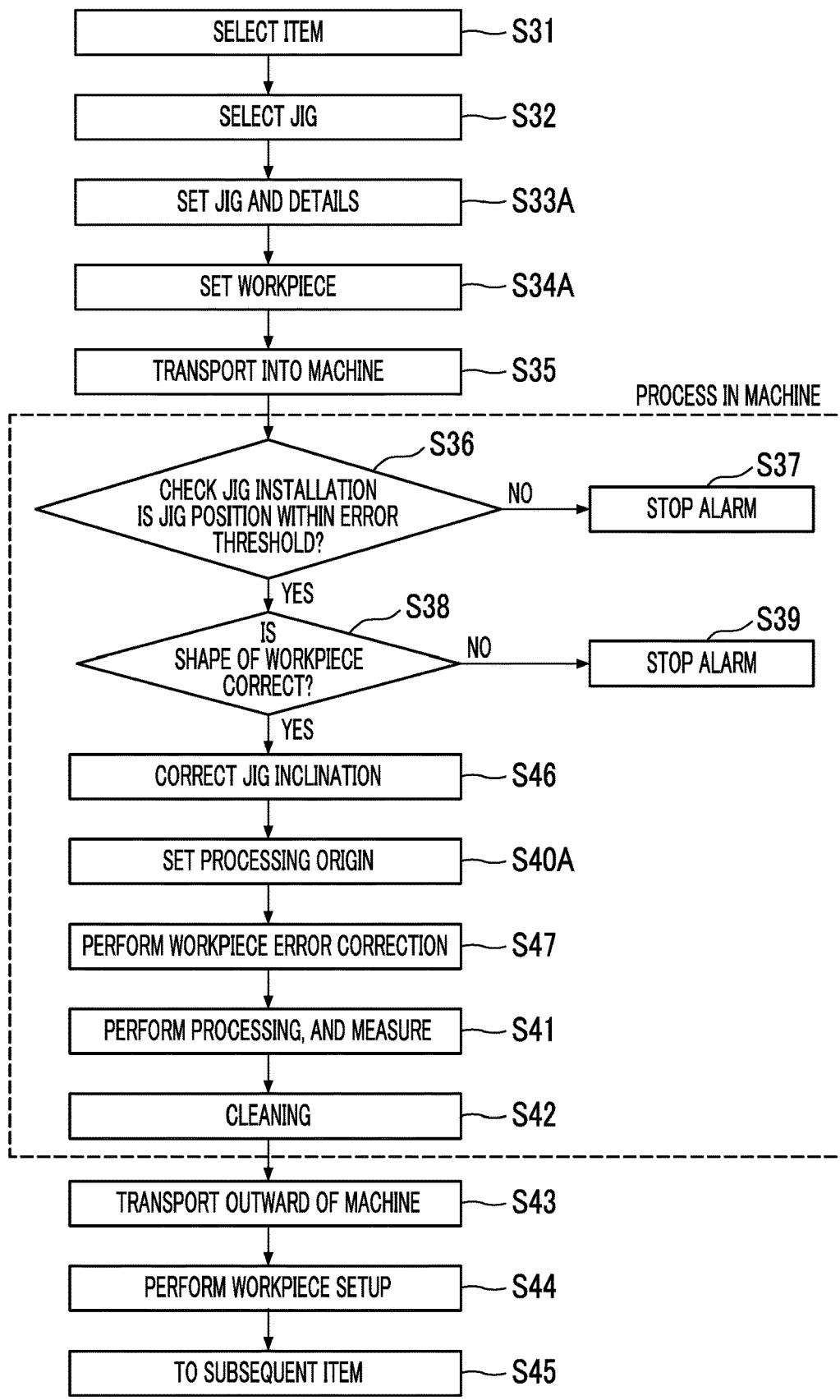
FIG. 8 is a flowchart illustrating a final finishing step.

Next, the final finishing performed at the third processing position B1 will be described with reference to FIG. 8. In the final finishing, the reference numerals obtained by adding 20 to the reference numerals of Step S in FIG. 7 will be given to the same steps as the steps described with reference to FIG. 7 (for example, S11 and S31 correspond to each other). Hereinafter, steps different from those in FIG. 7 will be described. The following steps are performed in accordance with commands of the control unit 27.

In Step S33A, the second jig base 5B and the detail 17 are set at the third processing position B1. The second jig base 5B is mounted in a single operation by inserting the pin 23 into the quick clamping device 22 (refer to FIG. 4B) of the sub-base 4, and the detail 17 is mounted in a single operation by inserting the pin into the quick clamping device 24 (refer to FIG. 4B) of the second jig base 5B.

In Step S34A, the workpiece W is set at the third processing position B1. In this case, the workpiece W is set by inserting the pin WP fixed to the workpiece W at the second processing position A2 into the quick clamping device 20 disposed in the second jig base 5B (refer to FIG. 4B).

After it is determined as YES in Step S38 and before the processing origin is set in Step S40A, the inclination of the second jig base 5B is corrected (Step S46). The inclination of the jig base 5B is corrected by using the third jig origin 33 (refer to FIG. 6). For example, the third jig origin 33 is detected in such a way that a touch sensor disposed in a robot hand comes into contact with the third jig origin 33. Since the inclination is corrected in this way, the processing can be accurately performed on the thickness (1 mm to 2 mm) of the workpiece W.

In order to set the processing origin in Step S40A, one of the workpiece origins 34a, 34b, and 34c (refer to FIG. 6) disposed in the workpiece W is used. In this way, in the final finishing performed at the third processing position B1, the origin is not the reference of the jig but the reference of the workpiece W. In this manner, the accuracy in the final finishing of the workpiece W can be ensured.

Error correction of the workpiece W is performed after Step S40A and before Step S41 (Step S47). The respective workpiece origins 34a, 34b, and 34c are used for the error correction. In this manner, an exact shape of the workpiece W is measured, and the error is corrected.

[Repetitive Processing]

Figure 9:
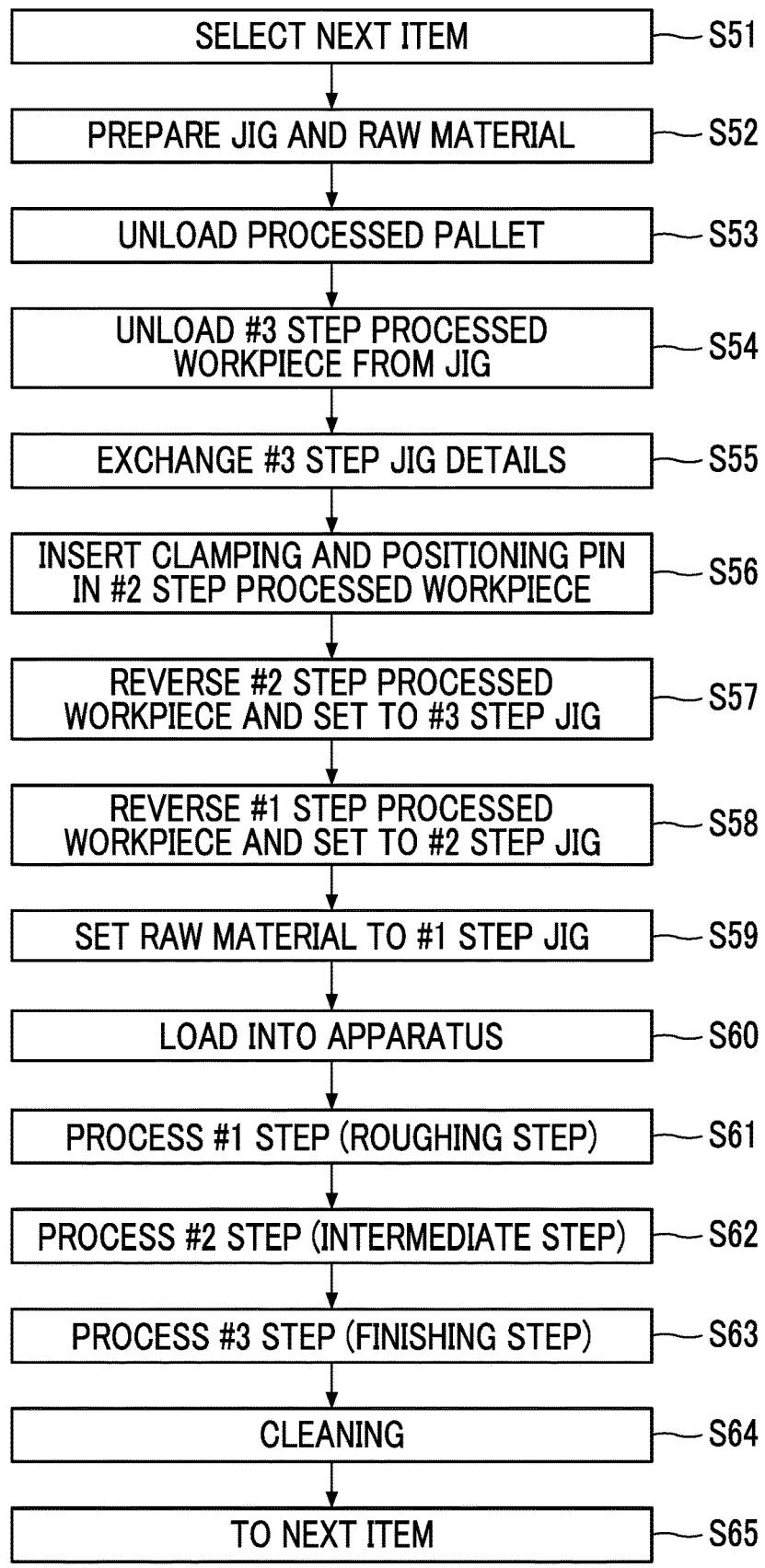
FIG. 9 is a flowchart illustrating a repetitive processing step.

Next, the case of performing repetitive processing will be described with reference to FIG. 9. The repetitive processing is performed in a case where similar items are processed at the respective processing positions A1, A2, and B1. The following steps are performed in accordance with commands of the control unit 27.

First, in Step S51, an item to be subsequently processed is selected, and the jig base and the raw material (unprocessed workpiece W) are prepared (Step S52).

Then, the palette P completely processed by the processing device is transported outward (Step S53), and the workpiece W completely processed at the third processing position B1 is fetched (Step S54).

Then, the jig base 5B and the detail 17 are exchanged at the third processing position B1 (Step S55).

In Step S56, after the finishing is performed on the rear surface of the workpiece W at the second processing position A2, the pin WP is inserted into the hole drilled in the tab WT.

Next, the front surface and the rear surface of the workpiece W are reversed at the second processing position by the transport robot 2 (refer to FIG. 1A), and the workpiece W is set at the third processing position B1 (Step S57).

In Step S58, the front surface and the rear surface of the workpiece W on which the roughing is completely performed the front surface of the workpiece W at the first processing position A1 are reversed by the transport robot 2, and the workpiece W is set at the second processing position A2.

In Step S59, the raw material which is the workpiece W before the roughing is performed is set at the first processing position A1 by the transport robot 2.

As described above, the workpieces W are completely set at the respective processing positions A1, A2, and B1. At the same time, the palette P is loaded into the apparatus (Step S60). The roughing is performed on the front surface of the workpiece W at the first processing position A1 (Step S61). The roughing and the finishing are performed on the rear surface of the workpiece W at the second processing position A2 (indicated as an "intermediate step" in the drawing) (Step S62). The final finishing is performed on the front surface of the workpiece W at the third processing position B1 (Step S63)

Then, the inside of the apparatus is cleaned using an air blow (Step S64), and a next item is prepared (Step S65).

The above-described steps are repeatedly performed. In this manner, if the subsequent item is a similar item, the processing can be efficiently performed using the respective processing positions A1, A2, and B1.

According to the present embodiment, the following operational effects are achieved.

The first processing position A1 and the second processing position A2 for performing the roughing on the workpiece W and the third processing position B1 for performing the final finishing are provided. The workpiece W has predetermined rigidity before the roughing is performed. Accordingly, the workpiece does not greatly deform even if the workpiece W is clamped. Therefore, the flexible vise 7 which can be easily fixed is disposed at the roughing position.

On the other hand, at the third processing position B1 where the final finishing is performed, the roughing is previously performed. Accordingly, the rigidity of the workpiece W is reduced, thereby causing a possibility that the workpiece W may deform if the workpiece W is clamped. Therefore, the quick clamping device for fixing the workpiece W by using the pin WP is disposed at the third processing position B1.

In this way, the clamping fixture and the pin fixture are properly used depending on the roughing and the final finishing. Accordingly, the roughing and the final finishing can be efficiently and accurately performed.

The plurality of processing positions A1, A2, and B1 are disposed in the same palette P that the processing is performed at the same time. Accordingly, automatic processing can be promoted.

The processing is performed at the roughing position before a final shape of the workpiece W is determined. During the processing, there is a possibility that the workpiece W may deform due to distortion of the raw material of the workpiece W. Accordingly, the jig base 5A for fixing the workpiece W is set as the position reference by using the first jig origin 31 and the second jig origin 32. On the other hand, in the final finishing performed at the third processing position B1, the final shape of the workpiece W is determined. Accordingly, the workpiece W is set as the position reference by using the workpiece origins 34*a*, 34*b*, and 34*c*, thereby ensuring processing accuracy.

The workpiece origins 34*a*, 34*b*, and 34*c* are set when the finishing is completely performed at the second processing position A2. In this manner, the workpiece origins 34*a*, 34*b*, and 34*c* can be formed in the workpiece W immediately before the final finishing is performed at the third processing position B1. Accordingly, a mismatch between pre-processing and the final finishing can be minimized as much as possible.

The jig bases 5A and 5B are detachably fixed onto the table 3 via the sub-base 4. In this manner, a plurality of the jig bases 5A and 5B corresponding to various workpieces V having different shapes are prepared, thereby enabling processing corresponding to various workpieces W to be performed.

The roughing is previously performed on the workpiece W on which the final finishing is to be performed. Accordingly, the workpiece W has lower rigidity. Therefore, the detail 17 which comes into surface contact with and supports the rear surface of the workpiece W is provided. In this manner, during the processing, the workpiece W can be processed without causing chatter vibration.

The detail 17 is detachably fixed to the second jig base 5B. Accordingly, a plurality of the details 17 corresponding to the facing surface of various workpieces W having different shapes are prepared, thereby enabling processing corresponding to various workpieces W to be performed.

The gas is suctioned using a vacuum pump via the suction piping 17*a* of the detail 17. In this manner, the rear surface of the workpiece W is adsorbed. In this manner, the workpiece W can be reliably held when the final finishing is performed.

In a case where the front surface and the rear surface of the workpiece W are processed, the workpiece W is transported between the first processing position A1, the second processing position A2, and the third processing position B1 by the transport robot 2. The roughing is performed on the front surface at the first processing position A1. The roughing and the finishing are performed on the rear surface at the second processing position A2. The finishing is performed on the front surface at the third processing position B1. In this manner, the workpiece W can be efficiently processed using one palette P.

In the present embodiment, a case has been described in which two (FIG. 1A) or three (FIG. 2A) processing positions are disposed in one palette P. However, the present invention is not limited thereto, and four or more processing positions may be disposed therein.

In addition, as an example, a case has been described in which the quick clamping devices 22, 20, and 24 are used as the device for detachably connecting the sub-base 4 and the jig bases 5A and 5B to each other, the device for detachably connecting the second jig base 5B and the workpiece W to each other, and the device for detachably connecting the second jig base 5B and the detail 17 to each other. However, other types may be adopted as long as the device is detachable.

REFERENCE SIGNS LIST

1: processing device
2: transport robot (transport machine)
3: table
4: sub-base
4*a*: suction piping
4*al*: piping connector (of suction piping)
5A: first jig base
5B: second jig base
5B*a*: suction piping
7: flexible vise (clamping fixture)
8: rail
11: jaw
13: jack
17: detail (support block)
17*a*: suction piping
17*b*: sealing material
17*c*: pin
20: quick clamping device (pin fixture)
22: quick clamping device
22*a*: suction piping
23: pin
24: quick clamping device
25: roughing tool
26: final finishing tool
27: control unit
28: vacuum pump (suction means)
31: first jig origin
32: second jig origin
33: third jig origin
34*a*, 34*b*, 34*c*: workpiece origin
35: palette origin
A: roughing position
A1: first processing position
A2: second processing position
B: final finishing position
B1: third processing position P: palette
W: workpiece
WT: tab
WP: pin

The invention claimed is:

1. A processing device comprising:
a roughing position at which a first roughing operation is capable of being performed on a workpiece;
a final finishing position at which a final finishing operation is capable of being performed on the workpiece processed at the roughing position;
a clamping fixture for clamping and fixing the workpiece, the clamping fixture being disposed at the roughing position;
a pin fixture for fixing the workpiece by accommodating a pin fixed to the workpiece, the pin fixture being disposed at the final finishing position;
a roughing tool for processing the workpiece installed at the roughing position;
a final finishing tool for processing the workpiece installed at the final finishing position; and
a control unit that controls the roughing tool and the final finishing tool,
wherein the control unit controls the roughing tool to perform the first roughing operation on the workpiece installed at the roughing position,
wherein the control unit controls the final finishing tool to perform the final finishing operation on the workpiece processed at the roughing position and installed at the final finishing position, and
wherein the control unit provides a command such that the workpiece processed at the roughing position is fixed by inserting the pin fixed to the workpiece into the pin fixture.

2. The processing device according to claim 1,
wherein the control unit sets a jig origin disposed in a jig, the jig being configured for fixing the workpiece, the jig origin serving as a position reference relative to the workpiece when the processing at the roughing position begins to be performed, and
wherein the control unit sets a workpiece origin disposed in the workpiece, the workpiece origin serving as a position reference relative to the workpiece when the processing at the final finishing position begins to be performed.

3. The processing device according to claim 2,
wherein the workpiece origin is disposed by drilling a hole in the workpiece when the processing at the roughing position has been completely performed.

4. The processing device according to claim 1, further comprising:
a sub-base installed on a table; and
a jig base detachably fixed onto the sub-base.

5. The processing device according to claim 4, further comprising:
a support block for supporting the workpiece by coming into surface contact with a facing surface of the workpiece, the support block being disposed at the final finishing position.

6. The processing device according to claim 5,
wherein the support block is detachably fixed to the jig base.

7. The processing device according to claim 6,
wherein the support block has a suction piping which is open to the facing surface of the workpiece, and
wherein suction means for suctioning gas via the suction piping is provided.

8. The processing device according to claim 1,
wherein the roughing position includes a first processing position at which the first roughing operation is capable of being performed on a front surface of the workpiece, and a second processing position at which a second roughing operation and a first finishing operation are capable of being performed on a rear surface of the workpiece,
wherein the final finishing position is a third processing position at which the final finishing operation is capable of being performed on the front surface of the workpiece, and
wherein transport means for transporting the workpiece between the first processing position, the second processing position, and the third processing position is provided.

\* \* \* \* \*